United States Patent [19]

Kawamura et al.

[11] 4,081,813
[45] Mar. 28, 1978

[54] PHOTOGRAPHIC INFORMATION SETTING APPARATUS FOR CAMERA

[75] Inventors: Masaharu Kawamura, Hino; Nobuaki Sakurada, Yokohama; Tadashi Ito, Yokohama; Hiroyashu Murakami, Yokohama; Fumio Ito, Yokohama; Nobuhiko Shinoda, Tokyo, all of Japan

[73] Assignee: Canon Kabushiki Kaisha, Tokyo, Japan

[21] Appl. No.: 690,154

[22] Filed: May 26, 1976

[30] Foreign Application Priority Data

Jun. 4, 1975 Japan ................................. 50-67331

[51] Int. Cl.² .......................... G03B 7/08; G03B 17/02
[52] U.S. Cl. ................................ 354/289; 354/23 D; 354/53; 354/60 A; 354/60 L
[58] Field of Search ............... 354/23 D, 60 A, 60 L, 354/289, 53

[56] References Cited

U.S. PATENT DOCUMENTS

| 3,971,048 | 7/1976 | Ito et al. ............................. 354/60 L |
| 3,999,191 | 12/1976 | Saito et al. ......................... 354/23 D |

FOREIGN PATENT DOCUMENTS 2,506,812  8/1975  Germany ........................... 354/23 D Primary Examiner—Russell E. Adams
Attorney, Agent, or Firm—Toren, McGeady and Stanger

[57] ABSTRACT

An apparatus for setting an exposure control factor into a camera in the form of a digital signal without using a code plate or a plurality of switches. A pulse train is fed to a binary counter through an AND circuit which, upon selective receipt of gating-on and gating-off signals, operates to initiate and terminate flow of pulses therethrough respectively. When the counter has counted the selected number of pulses, the photographer who is viewing a digital display unit cooperative with the counter to detect this pulse number may actuate a button to produce the gating-off signal, thereby a corresponding desired value of the exposure control factor is set into the camera as a function of the number of pulses counted.

9 Claims, 11 Drawing Figures

| COUNTER 9 OUTPUT | | | INDICATOR | EXPOSURE TIME (S) | APERTURE VALUE |
|---|---|---|---|---|---|
| O3 | O2 | O1 | | | |
| 0 | 0 | 1 | L1 | 1/512 | 1.4 |
| 0 | 1 | 0 | L2 | 1/256 | 2 |
| 0 | 1 | 1 | L3 | 1/128 | 2.8 |
| 1 | 0 | 0 | L4 | 1/64 | 4 |
| 1 | 0 | 1 | L5 | 1/32 | 5.6 |
| 1 | 1 | 0 | L6 | 1/16 | 8 |
| 1 | 1 | 1 | L7 | 1/8 | 11 |

PHOTOGRAPHIC INFORMATION SETTING APPARATUS FOR CAMERA

BACKGROUND OF THE INVENTION

1. Field of the Invention

This invention relates to photographic cameras of digital exposure control structure, and, more particularly, to a system for setting an exposure control factor such as a shutter speed or aperture value into the camera in the form of a digital signal, while manually operating a single button.

2. Description of the Prior Art

It is known to set an exposure control factor into a camera in the form of a digital signal, as, for example, disclosed in U.S. Pat. No. 3,928,858 issued Dec. 23, 1975 or German Laid-Open Application No. 2,449,092. The method of this patent necessitates the use of a code plate and contact pins. As the pins are worn out, therefore, the life-time of the camera is shortened. Further, because of the mechanical setting of the camera by the code plate, a complicated exposure control structure results.

On the other hand, it is also known to provide an electrical setting apparatus as disclosed in U.S. Pat. No. 3,748,979 issued July 31, 1973 or German Patent Application Publication No. 2,164,243 issued July 5, 1973, wherein a counter for storing the exposure control factor is connected at its input terminal to the output terminal of an AND circuit having two input terminals, one of which is connected to the output terminal of a pulse generator, and another input terminal which is connected to the output terminal of a photoelectric pulse generator. Thus, the number of pulses dependent upon the width of a pulse supplied from the photoelectric pulse generator is applied to the counter.

However, this pulse width is proportional to the object brightness level as photoelectrically sensed, and, further, the counter is provided with no display unit so that it is impossible to set a desired value of the exposure control factor into the camera.

SUMMARY OF THE INVENTION

An object of the present invention is to provide a novel photographic information setting apparatus.

Another object is to provide an apparatus of simple structure and capable of applying a desired exposure factor as a digital signal to a counter of a digital control circuit.

Still another object is to provide an apparatus which permits selection of a desired time interval necessary to set the exposure control factor into the counter.

A further object is to provide an apparatus which, when the already set exposure factor value as displayed is over the desired level, enables the photographer to perform backward setting operation rapidly to the desired level.

A further object is to provide an apparatus capable of retaining the storage of the content of the counter for a predetermined time interval even when the power switch is opened.

DESCRIPTION OF THE PREFERRED EMBODIMENTS

Figure 1:
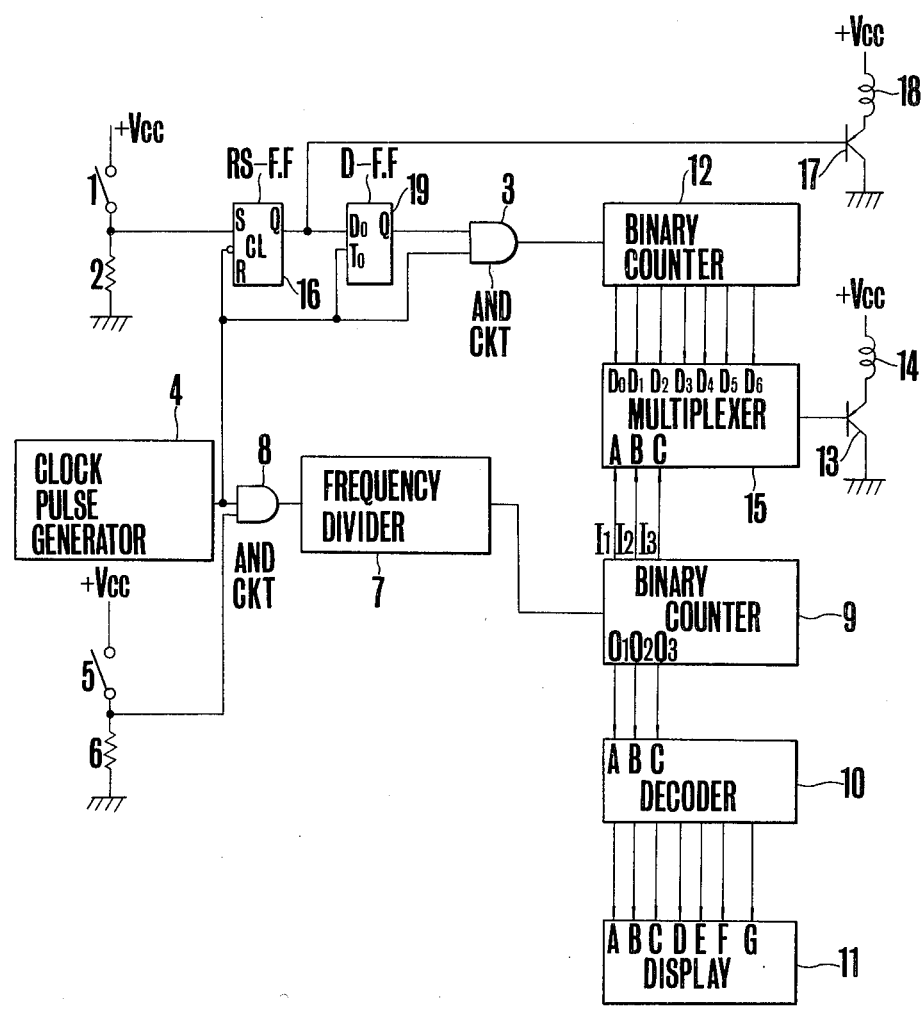
FIG. 1 is a block diagram of one embodiment of a photographic information setting apparatus according to the present invention as associated with a digitally operated shutter control circuit.

Referring to FIG. 1, there is shown the main embodiment of a photographic information setting system according to the invention as applied to a camera having a digitally operated shutter. A digital exposure control circuit for the shutter which, though not shown, is of the two focal plane type is shown as including an actuator having a switch 1 and a resistor 2 connected in series to each other and to a battery at its positive terminal which is generally designated by $+V_{cc}$. The switch 1 is arranged to cooperate with a camera release lever not shown. An AND circuit 3 has a gating control input terminal connected to the output terminal of actuator 1, 2 through a reset flip-flop 16 or RS-FF. and a delay flip-flop 19 or D-F.F. The digital exposure control circuit also has an input terminal connected to the output terminal of a clock pulse generator 4 which may be of the type known, for example, in U.S. Pat. No. 3,748,979, first and second binary counters 9 and 12. A second binary counter 12 having an input terminal connected to the output terminal of the AND circuit 3, and a multiplexer 15 connected between the first and second binary counters 9 and 12 and having an output terminal connected to the base electrode of a switching pnp transistor 13 are also included. The emitter electrode of transistor 13 is connected to the positive terminal of battery $V_{cc}$ through a coil 14 of a not shown electro-magnet controlling operation of the tailing shutter curtain, also not shown. For controlling operation of the leading shutter curtain, there is provided a switching pnp transistor 17 having a base electrode connected to the output terminal Q of the RS-F.F., and having an emitter electrode connected to the positive terminal of battery $V_{cc}$ through a coil 18 of a not shown electromagnet. The set input terminal S of RS-F.F. is connected to a point on the connection between the switch 1 and resistor 2, while the reset input terminal R is connected to the clock pulse generator 4. The D-F.F. has a set input terminal $D_0$ connected to the output terminal of RS-F.F. and a clock terminal $T_0$ connected to the generator 4. The multiplexer 15, which may be of the type available from Texas Instruments Incorporated under the name of "SN54151A", has seven data input terminals $D_0$ to $D_6$ connected to respective output stages of the second binary counter 12 and has three data select input terminals A, B and C connected to respective output stages $L_1$, $I_2$ and $I_3$ of the first binary counter 9. The counter 9 has another series of output stages 01, 02 and 03 which provide the same outputs as those of the output stages $I_1$, $I_2$ and $I_3$.

The system of the invention comprises a common clock pulse generator 4 of the digital exposure control circuit described above, a set control switch 5 connected in series to a resistor 6 and to the positive terminal of battery Vcc, a frequency divider 7, which may be a frequency dividing circuit shown in U.S. Pat. No. 3,478,979, having an input terminal connected to the output terminal of the clock pulse generator 4 through an AND circuit 8 and having an output terminal connected to the input terminal of the first binary counter 9 of the exposure control circuit, the gating control input terminal of the AND circuit 8 being connected to a point on the connection between the switch 5 and resistor 6, a decoder 10 having three input terminals A, B and C connected to the respective output stages 01, 02 and 03 of the first binary counter 9, the first and third stages 01 and 03 representing least and most significant bits respectively, and a display unit 11.

Figure 2:
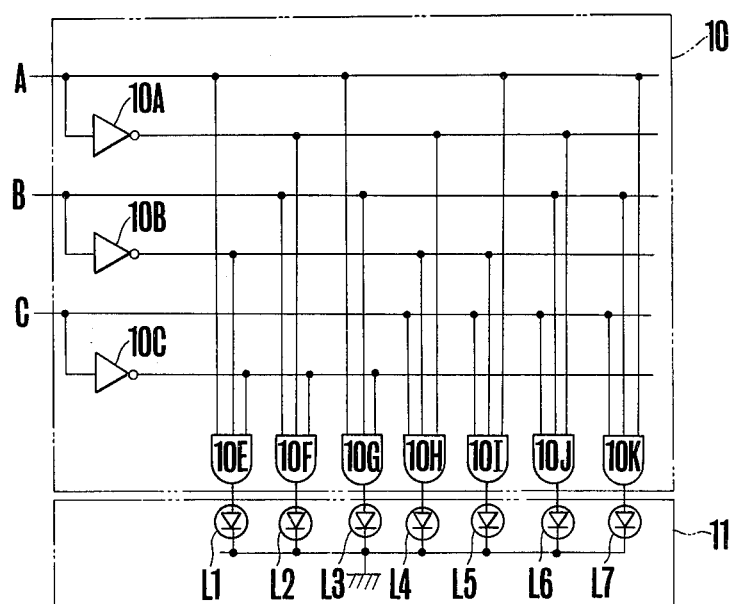
FIG. 2 is a block diagram showing the details of the decoder and display unit of FIG. 1.

FIG. 2 shows the details of the decoder 10 and display unit 11, wherein reference numerals A, B and C denote the respective input terminals of the decoder of FIG. 1. The decoder 10 comprises three inverters 10A, 10B and 10C and seven AND circuits 10E to 10D, these parts being arranged so that when the first binary counter 9 produces one of the possible binary-coded signals listed in FIG. 3, one corresponding AND circuit is selected from the group of the AND circuits 10E to 10K to produce an output which is detected by the display unit 11 having seven luminous diodes $L_1$ to $L_7$ connected to the respective outputs of AND circuits 10E to 10K.

Figures 3, 4:
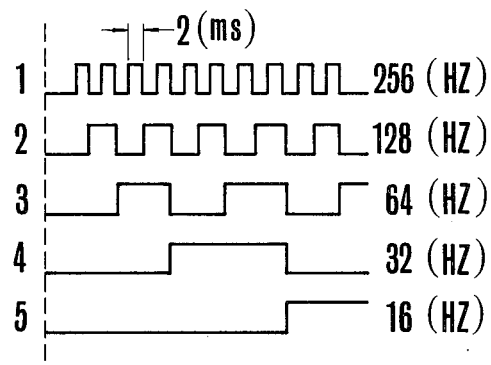
FIG. 3 is a table of numerical data relating a series of shutter times and diaphragm values to digital signals of binary-coded form stored in the counter of FIG. 1.
FIG. 4 is a view showing waveforms of outputs of the frequency divider of FIG. 1.

The operation of the camera of the construction shown in FIGS. 1 and 2 will be next described with reference to FIGS. 3 and 4. In order to set a desired numerical value of an exposure control factor, in this instance, shutter speed, into the first counter 9 of the digital exposure control circuit, a reset pulse generator not shown is actuated to reset the frequency divider 7, counters 9 and 12 and flip-flops 16 and 19, and then the set control switch 5 is manually closed to apply a "1" signal to the gating control input terminal of AND gate 8, thereby a clock pulse train is allowed to flow through the gated-on AND circuit to the frequency divider 7. Now assuming that these clock pulses occur at a frequency of 512 Hz. and that the frequency divider has eight counter stages with the eighth counter stage being connected to the input terminal of the first binary counter 9, a first pulse is applied from the frequency divider 7 to the counter 9 after the duration of a time interval of 0.25 second from the closure of the set control switch 5, thereby the counter 9 is set from its initial binary-coded (0, 0, 0) state to a binary-coded (0, 0, 1) state where the first and second series of output stages $I_1$, $I_2$ and $I_3$, and 01, 02 and 03 produce binary-coded outputs (0, 0, 1) as shown in FIG. 3 to energize the first luminous diode $L_1$. The photographer looking through a camera view finder, as the display unit 11 is located in the view finder optical system, is informed that the instant content of the counter 9 corresponds to an exposure time of 1/512 second (see FIG. 3). So long as the control switch 5 is closed, a second pulse is applied to the counter 9 to energize the second luminous diode $L_2$ after a time interval of 0.5 second from the initiation of energization of the first luminous diode $L_1$. Further assuming that the photographer intended to set a shutter speed of 1/256 second into the counter 9, as soon as the second luminous diode $L_2$ is lighted on, the photographer may turn off the control switch 5 to apply a "0" signal or switching signal to the AND circuit 8 to terminate flow of pulses from the clock pulse generator 4 to the frequency divider 7. As the total number of pulses counted by the counter 9 is two, the content of counter 9 is (0, 1, 0). If the counter 9 is to be set to a content corresponding to a shutter speed of ⅛ second, the photographer needs only to close the control switch 5 until the seventh luminous diode $L_7$ is lighted on as can be seen from FIG. 3.

When the camera release button not shown is depressed, the switch 1 is closed to apply a "1" signal to the "set" terminal of RS flip-flop 16. In synchronism with the tailing edge of a first clock pulse from the generator 4, therefore, the output terminal Q of RS flip-flop 16 becomes a "1" state. On the other hand, this first clock pulse is also applied to the clock terminal $T_0$ of the delay flip-flop 19, but the output terminal Q of the D flip-flop 19 does not change to the "1" state, because the input terminal $D_0$ remains in "0" state at this time. For this reason, all the stages of the second counter 12 are in their "0" states. The output of RS flip-flop 16 is applied to the base electrode of the pnp transistor 17, thereby the coil 18 is de-energized to release the leading shutter curtain from its latched position to initiate an exposure. In synchronism with the leading edge of a second clock pulse, the D-flip-flop 19 produces a "1" signal which is then applied to the gating control input of the AND circuit 3 to initiate flow of clock pulses from the generator 4 to the second counter 12. In synchronism with the tailing edge of the second clock pulse, the first stage (least significant bit) is set to a "1" state with the resulting input of the multiplexer 15 at its first data input terminal $D_0$ being in a "1" state. Now assuming that the first counter 9 has been set to a content (0, 1, 0) corresponding to an exposure time of 1/256 second with the resulting data select inputs of multiplexer 15 being in their (0, 1, 0) states, when a third clock pulse is applied through the AND circuit 3 to the second binary counter 12, the data inputs of multiplexer 15 become "1" at only the second input terminal $D_1$ and remain "0" at all the other input terminals to produce a "1" output which is applied to transistor 13 to de-energize the coil 14, thereby the tailing shutter curtain is caused to run down to the exposure aperture closed position. As a result, the period of actuation of the digitally operated shutter is controlled in accordance with the content of the first binary counter 9. To make a correct exposure, it is of course necessary to adjust the size of diaphragm aperture by taking into account the selected shutter speed, the sensitivity of the used film, the object brightness level, and the like.

Figure 5:
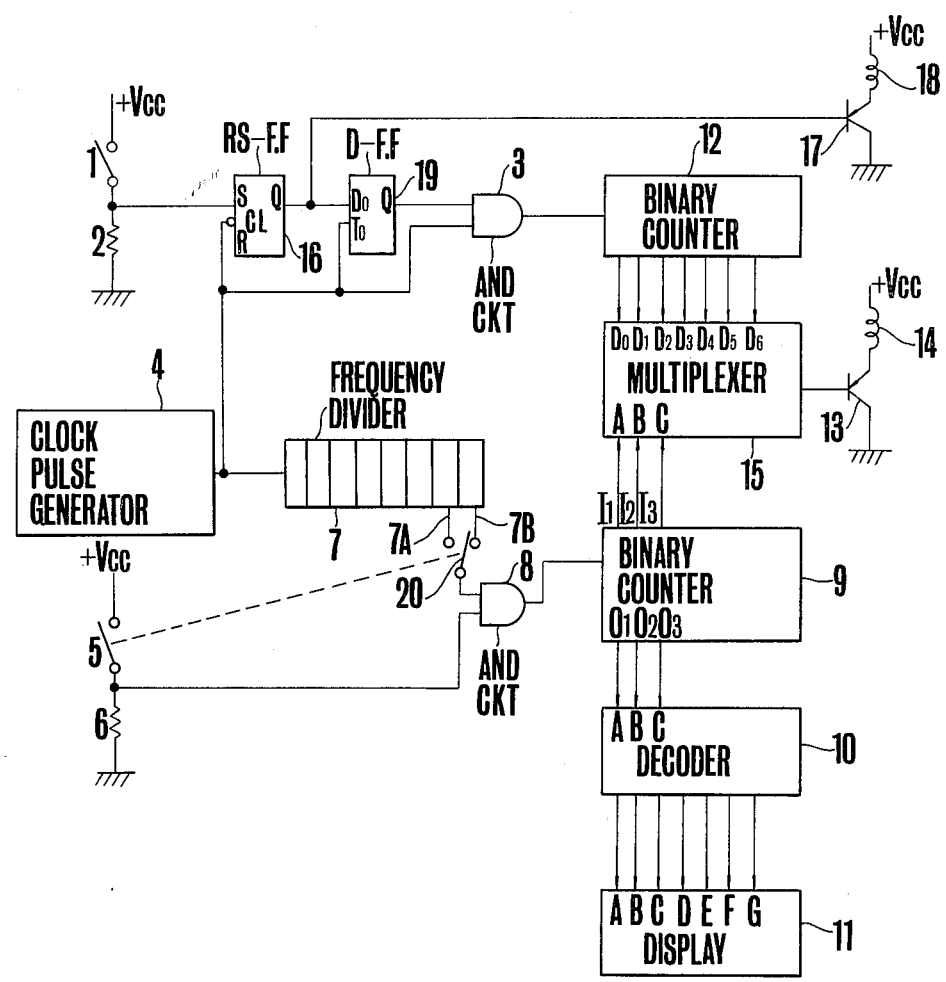
FIG. 5 is a block diagram of another embodiment of the invention.

FIG. 5 shows another embodiment of the invention which remains substantially unchanged in construction from the embodiment of FIGS. 1 and 2 except that the AND circuit 8 is arranged between the frequency divider 7 and the first binary counter 9 and is provided with a selector switch 20 arranged to selectively connect either of the seventh and eighth counter stages 7A and 7B of the frequency divider 7 to the input terminal of the AND circuit 8. With this arrangement, it is possible to have the time interval necessary to set the exposure control factor into the first binary counter 9 of FIG. 1, provided that the seventh counter stage 7A of frequency divider 7 is connected by the switch 20 to the input terminal of the AND circuit 8. For facilitating manipulation of this selector switch 20, it is associated with a control knob for the setting control switch 5 so that upon depression of the control knob to the first stroke, the switch 5 is closed, while switch 20 remains in its "7B" position, and, upon further depression to the second stroke, the switch 20 is set from its "7B" position to its "7A" position, while the switch 5 remains closed.

Figure 6:
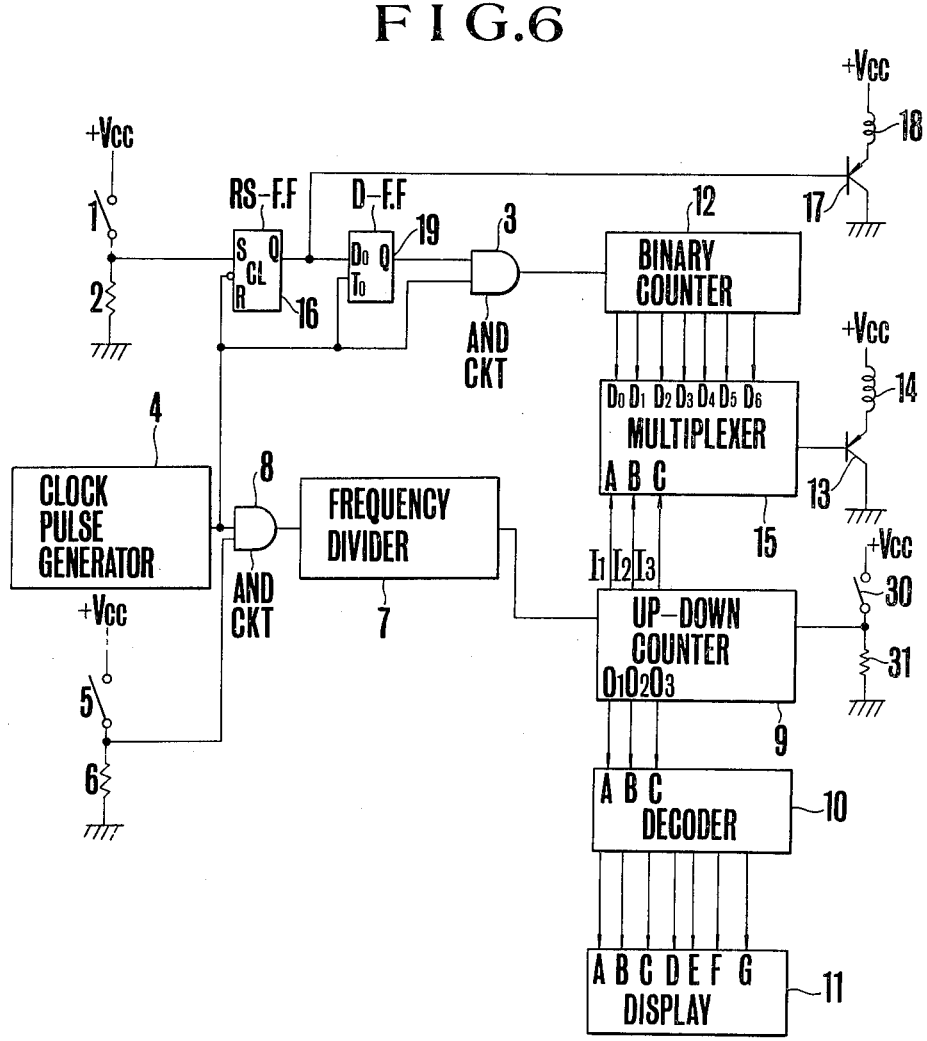
FIG. 6 is a similar diagram of still another embodiment of the invention.

FIG. 6 shows still another embodiment of the invention which is different from the embodiment of FIG. 1 in a point that the first binary counter 9 is replaced by an UP-DOWN type binary counter associated with a control switch therefor. There is an advantage to this embodiment as compared with FIG. 1 embodiment such that when the photographer has failed to open the setting control switch 5 at a time coincident with the instant at which an indication of a numerical value not exceeding the desired one appears in the display unit 11, he must wait for the next opportunity until one cycle of operation of the counter 9 as detected by display unit 11 is completed. The embodiment of FIG. 6 has overcome this problem.

Figure 7:
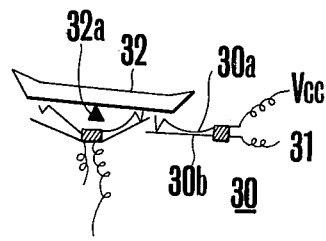
FIG. 7 is a schematic view of the switches of FIG. 6.

The control switch for the UP-DOWN type binary counter 9 is constructed from a switch 30 and a resistor 31 connected in series to each other and to the positive terminal of battery Vcc. Connected to a point on the connection between the switch 30 and resistor 31 is the up-counting and down-counting control terminal of the counter 9. This switch 30 is arranged adjacent the setting control switch 5 so that individual and correlated operations of these two switches 5 and 30 are controlled by a single member 32 which is accessible from the outside of the camera as shown in FIG. 7. The single member 32 is constructed in the form of a seesaw knob fulcrumed at a support 32a. When the seesaw knob is turned counter-clockwise as viewed in FIG. 7, a movable contact 5a1 is brought into contact with a fixed contact 5b1 to effect closing of the switch 5 alone. When turned clockwise, movable contacts 5a2 and 30a are brought into contact with respective fixed contacts 5b2 and 30b to effect closing of both switches 5 and 30.

In operating the camera of FIG. 6, when the seesaw knob 32 is turned clockwise, the AND circuit 8 is gated on as described before and a "1" signal is applied from switch 30 to the up-counting and down-counting terminal of the UP-DOWN counter 9 to permit up-counting operation of the counter 9. As the number of pulses counted by the counter 9 increases, the diodes $L_1$ to $L_7$ of the display device 11 are successively actuated every 0.5 second to lighting-on. Now, assuming that the photographer, though intending to make an exposure with an exposure time of 1/256 second, has actually set a one-step advanced exposure time, namely, 1/128 second, because of the unduly elongated closure of the switch 5, in other words, the switch 5 was not opened until the third luminous diode $L_3$ is lighted on, he may turn the seesaw knob 32 counter-clockwise, thereby the movable contact 30a is taken out of contact with the fixed contact 30b to permit down-counting operation of the counter 9. At the same time, the movable contact 5a1 is brought into contact with the fixed contact 5b1 so that when a fourth pulse is applied from the frequency divider 7 to the counter 9, the content of the counter 9 is counted down by one with the result that the second luminous diode $L_2$ is lighted on instead of the fouth luminous diode $L_4$ which would be lighted on when used in the embodiments of FIGS. 1 and 5, or when the seesaw knob remains in the clockwise advanced position. As soon as the lighting-on of the second luminous diode $L_2$ is noticed, the photographer may turn the seesaw knob clockwise to the neutral position where the switch 5 is opened. Thus, the counter 9 is set to a content (0, 1, 0) corresponding to an exposure time of 1/256 second without the necessity for the photographer of waiting the completion of one cycle operation of the counter 9.

Figure 8:
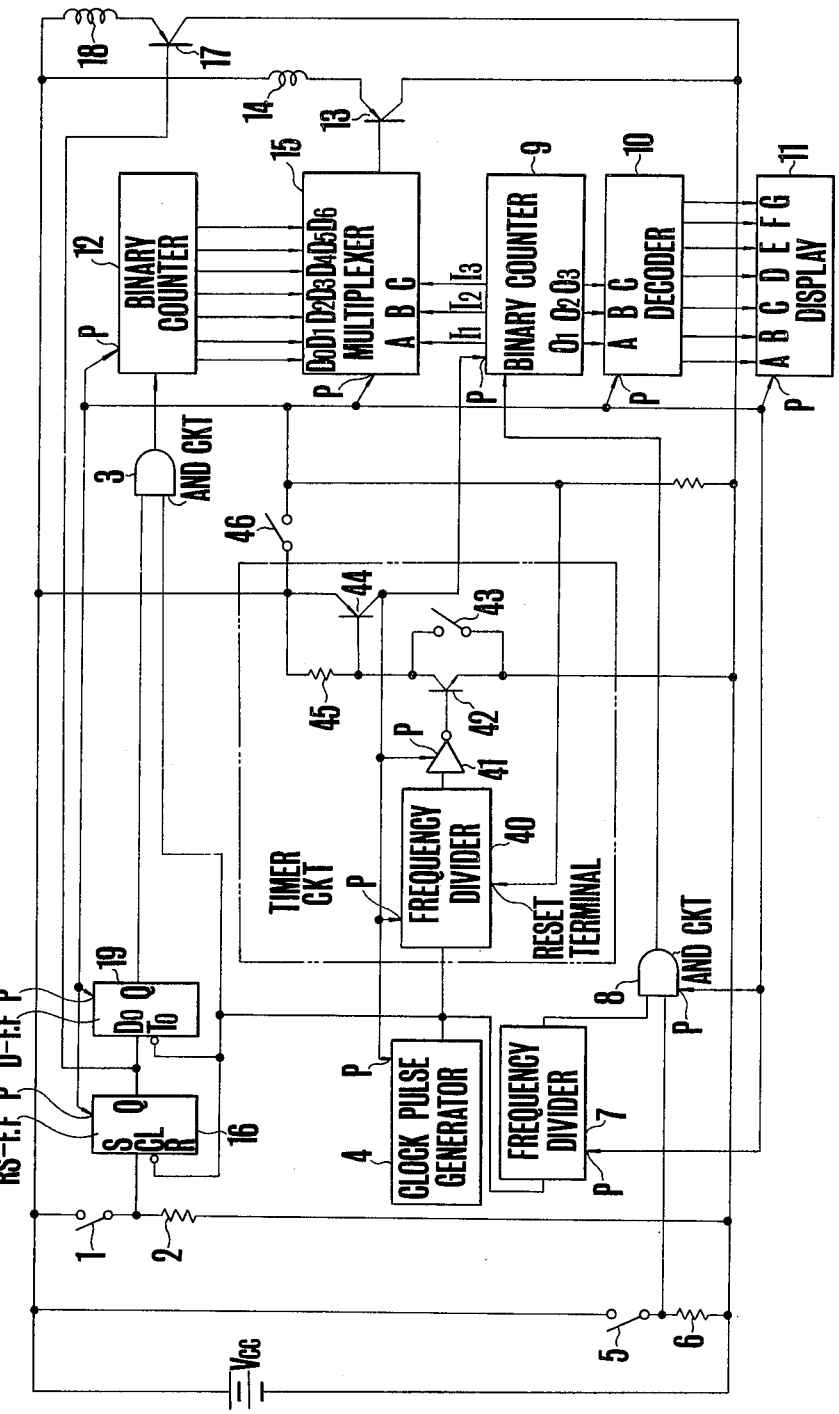
FIG. 8 is a block diagram of a further embodiment of the invention.

FIG. 8 shows a further embodiment of the invention employing a timer circuit enclosed by dash lines for permitting retention of the content of the counter 9 during a predetermined time interval after the power switch is opened. The power supply from the battery Vcc to elements 7, 8, 10, 11, 12, 16 and 19 is controlled by a single mechanical switch 46, while the power supply to elements 4, 9, 40 and 41 is controlled by a combination of switches 42, 43 and 44. The timer circuit includes a frequency divider 40 constructed from a binary counter or counters in a manner known in the art as likewise that of the frequency divider 7. The frequency divider 40 has an input terminal connected to the output terminal of the clock pulse generator 4, and has a "reset" terminal connected through the power switch 46 to the positive bus line. The output terminal of frequency divider 40 is connected through an inverter 41 to the base electrode of the npn transistor 42 having an emitter electrode connected to the negative bus line and having a collector electrode connected to the positive bus line through a resistor 45. The switch 43 is connected across the transistor 42 at its collector and emitter electrodes and is arranged to cooperate with the switch 46. Connected to a point on the connection between the resistor 45 and the collector electrode of transistor 42 is the base electrode of the pnp transistor 44 having an emitter electrode connected to the positive bus line and having a collector electrode connected to the power supply line for the elements 4, 9, 40 and 41.

In operating the camera of FIG. 8, when the power switch 46 is closed with the resulting closure of switch 43, a driving voltage is applied from the battery Vcc to the frequency divider 7, AND circuit 8, decoder 10, display unit 11, binary counter 12, RS flip-flop 16 and D flip-flop 19 through their respective power supply receipt terminals P, and a base current is caused to flow transistor 44 through the closed switch 43, thereby transistor 44 is rendered conducting. Therefore, the counter 9 and clock pulse generator 4 are also rendered operative, but the frequency divider 40 of the timer circuit remains inoperative as an actuating signal is applied to the "reset" terminal of the divider 40. Next when the switch 5 is closed, the frequency divider 7 receptive of a clock pulse train from the generator 4 produces pulses in sequence which are counted by the counter 9 with the result that the luminous diodes of display unit 11 are successively lighted on as has already been explained in connection with FIGS. 1 to 4. After a desired shutter speed has been set into the binary counter 9, the photographer may close the switch 1 to effect an exposure with the exposure time as set in the binary counter 9. Such procedure is valid when the closure of the power switch 46 is not broken therethrough.

If an exposure is to be made with a desired exposure time as set in the binary counter 9 after the closure of the power switch 46 is once broken, the following procedure will result. When the power switch 46 is opened, elements 7, 8, 9, 10, 11, 12, 16 and 19 are cut off from the power supply, but the binary counter 9, clock pulse generator 4, frequency divider 40 and inverter 41 continue to be supplied with a driving voltage from the battery Vcc for a predetermined time interval dependent upon the characteristics of the frequency divider 40. This is because, just before the power switch 46 is opened, the frequency divider 40 receptive of the actuating signal at its "reset" terminal produces a "0" signal which is then inverted by the inverter 41 to a "1" signal with the result that the transistor 42 is rendered conducting as the switch 43 is opened in cooperation with the power switch 46. For this reason, the transistor 44 remains in the conducting state regardless of the opening of the switch 46.

Upon opening of the switch 46, the supply of the actuating signal to the "reset" terminal of the frequency divider 40 is cut off causing initiation of pulse-counting operation of the frequency divider 40. At the instant when a predetermined number of clock pulses supplied from the clock pulse generator 4 has been counted by the frequency divider 40, the divider 40 produces a "1" signal which is then inverted to a "0" signal by the inverter 41 with the result that the transistors 42 and 44 are rendered non-conducting to cut off the driving voltage supply from the binary counter 9. If the photographer closes the power switch 46 before the termination of duration of a time interval necessary for the frequency divider 40 to count the predetermined number of clock pulses, all the elements of FIG. 8 are rendered operative again with the previously set content of the binary counter 9 being effective for making a next exposure in accordance therewith.

Figure 9:
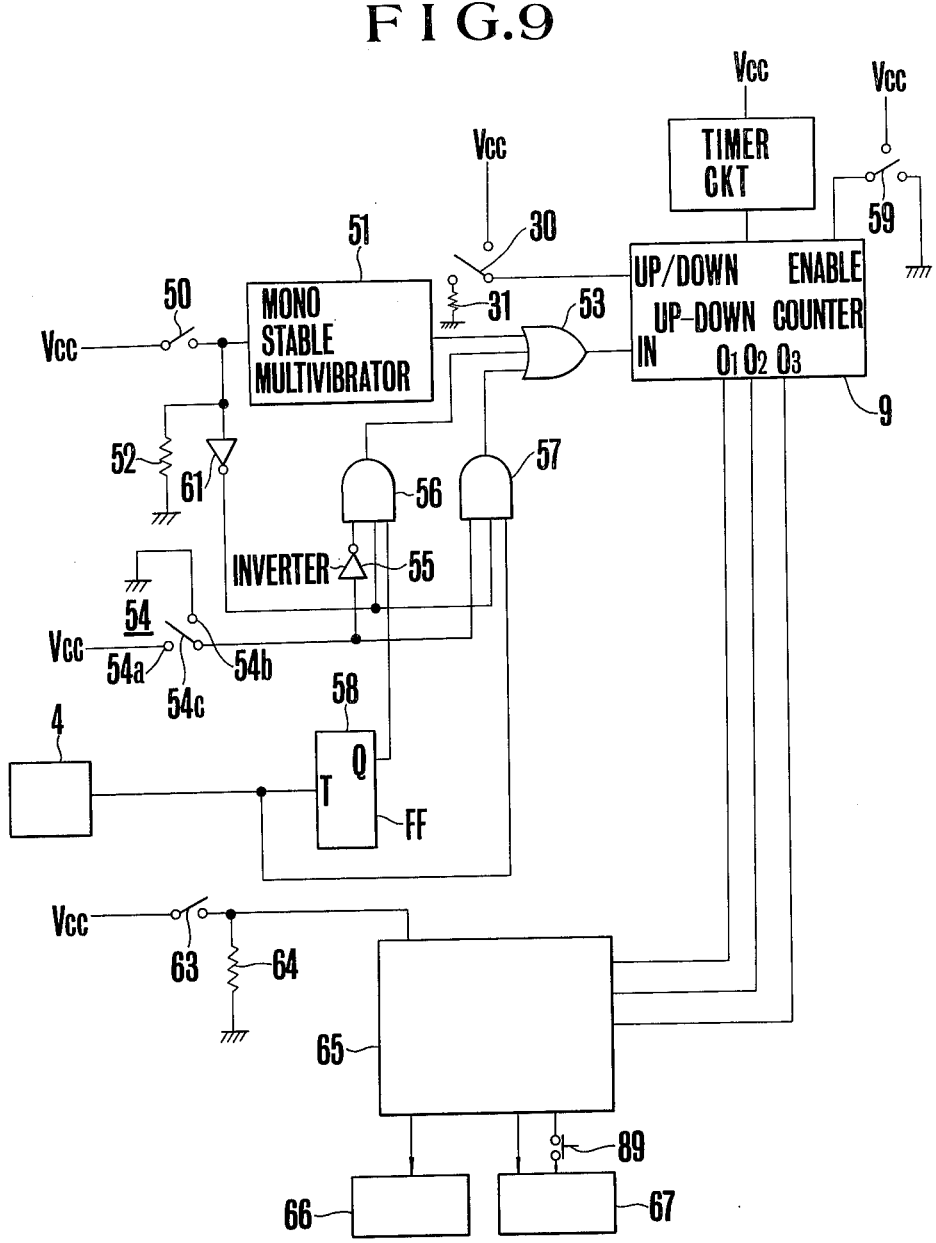
FIG. 9 is a circuit diagram, partly in block form, of still a further embodiment of the invention.
Figure 10:
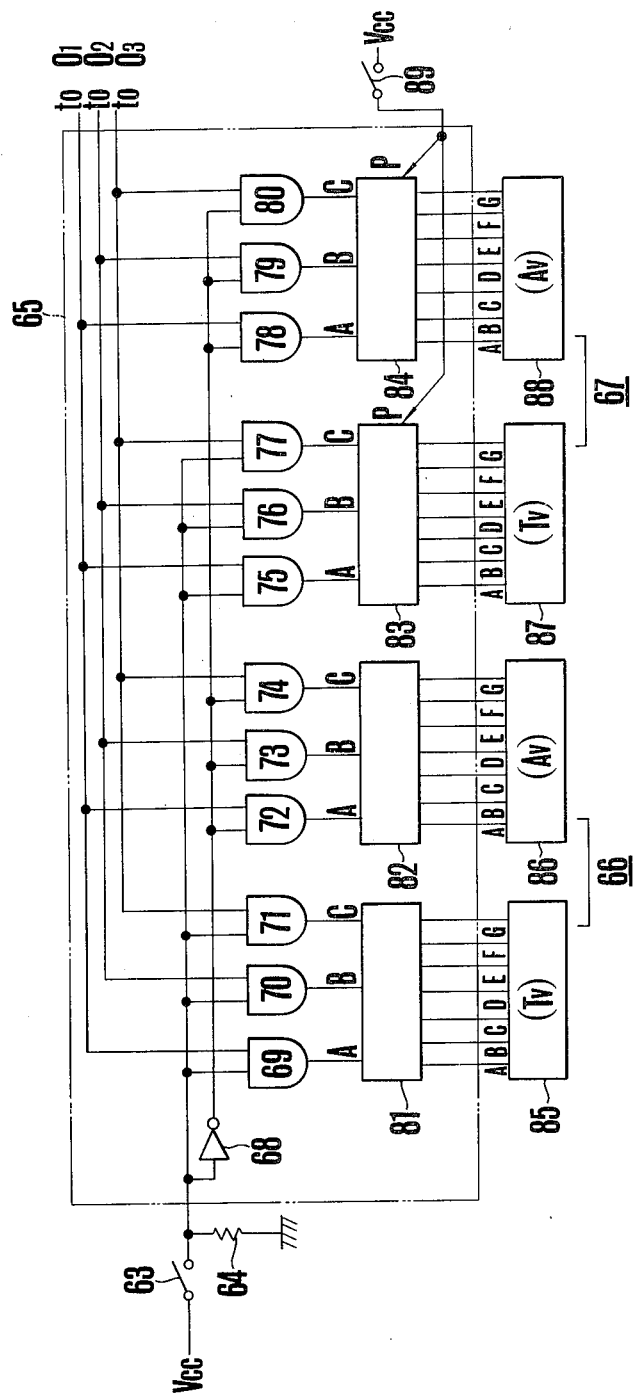
FIG. 10 is a circuit diagram, partly in block form, showing the details of the control circuit and display unit of FIG. 9.

FIGS. 9 and 10 show an alternative embodiment of the present invention adapted to the purpose of selectively setting either of two different exposure control factors, in this instance, shutter speed and diaghragm value, in either manual or automatic manner to a common UP-DOWN counter cooperative with two pairs of separate display units, one unit for shutter speed and the other for diaphragm value, and one pair within the view finder and the other outside thereof.

For manual setting of numerical values of an exposure control factor in progression, there is provided an actuator switch 50 in combination with a monostable multivibrator 51 having an input terminal connected through a not shown differentiation circuit to the output terminal of the actuator switch 50 and having an output terminal connected through an OR circuit 53 to the input terminal IN of an UP-DOWN counter 9 having the same function as that of the counter 9 shown in FIG. 6. It is now to be noted that though the binary counter 9 of FIGS. 1, 5, 6 and 9 is illustrated as having two sets of output terminals $I_1$, $I_2$ and $I_3$ and $O_1$, $O_2$ and $O_3$, such illustration is made for the purpose of clarity, and the actual case is somewhat different therefrom as these two sets of output terminals may be combined with each other to form a single set of output terminals.

For automatic setting of numerical values of an exposure control factor in progression at a selected one of two setting speeds, there is provided a flip-flop 58 in combination with a clock pulse generator 4 having an output terminal connected to the input terminal IN of counter 9 through two different selective channels, one of which includes a flip-flop 58 having an input terminal connected to the output terminal of generator 4 and an AND circuit 56 having an input terminal connected to the output terminal of flip-flop 58 and having an output terminal connected to an input terminal of OR circuit 53, and another channel which includes an AND circuit 57 having an input terminal connected to the output terminal of generator 4 and having an output terminal connected to an input terminal of OR circuit 53. For selective gating of these two AND circuits 56 and 57 between two setting speeds, there is provided a selector switch 54 having two fixed contacts 54a and 54b connected to the battery Vcc and ground respectively and having a common movable contact 54c connected both to an input terminal of AND circuit 56 through an inverter 55 and to an input terminal of AND circuit 57. The AND circuits 56 and 57 each have an additional input terminal connected through a common inverter 61 to the output terminal of the actuator switch 50, thereby it being made possible to select either of manual and automatic setting modes. 52 is a resistor connected to the inverter 61. For selecting either of two display modes, namely, shutter speed display and diaphragm value display, there is provided a second selector switch 63 connected between the positive terminal of battery Vcc and a control circuit 65, the opposite pole of switch 63 to that connected to battery Vcc being grounded through a resistor 64.

In FIG. 10, there is shown the details of the control circuit 65 as including two pairs of decoders 81, 82, 83 and 84 associated with respective display units 85, 86, 87 and 88, the display units 85 and 86 for shutter speed (Tv) and diaphragm value (Av) respectively constituting a composite display unit 66 of FIG. 9 adapted for incorporation within the housing of a camera finder, and the display units 87 and 88 for shutter speed (Tv) and diaphragm value (Av) respectively constituting a composite display unit 67 of FIG. 9 adapted to be positioned outside of the finder at a location suitable for viewing.

Each of the decoders 81 to 84 has the same function as that of decoder 10 of FIG. 1, as may be constructed in a similar manner to that shown in FIG. 2, and has three input terminals A, B and C connected to respective output terminals of three AND circuits 69, 70 and 71, or 72, 73 and 74, or 75, 76 and 77, or 78, 79 and 80. Six AND circuits 69 to 71 and 75 to 77 associated with decoders 81 and 83 for shutter speed display units 85 and 87 are connected at their one input terminals to the display mode selector switch 63, while the other AND circuits are connected at their one input terminals through a common inverter 68 to the switch 63. The other input terminals of all the AND circuits 69 to 80 as grouped by three are connected to the respective output terminals 01, 02 and 03 of the UP-DOWN counter 9 of FIG. 9. 89 is a power supply control switch for the decoders 83 and 84.

Each of the display units 85 to 88 has the same construction as that shown in FIG. 2. The luminous diodes $L_1$ to $L_7$ of the display unit 85 or 87 are provided with respective transparent or reflective members carrying indicia, for example, diode $L_1$ with an indicium of 1/512 representing an exposure time of 1/512 second as shown in the table of FIG. 3, while the diode $L_1$ of the diaphragm value display units 86 or 88 is provided with a like member carrying an indicium of 1.4 representing F : 1.4, as understandable from the table of FIG. 3.

The operation of the photographic information setting system of FIG. 9 for a camera is as follows. It is to be assumed that the camera has either of digitally operating shutter and diaphragm control circuits. The shutter control circuit may be of the type shown in connection with the abovementioned embodiments of the invention.

If a desired shutter speed is to be manually set into the counter 9, switch 63 is closed and switches 30 and 59 are moved to the "Vcc" positions to render the counter 9 operative in up-counting manner. A control knob now shown is depressed to a first stroke to close switch 50, causing the multivibrator 51 to produce one pulse which is then applied through OR circuit 53 to the counter 9 with the resulting least significant bit being "1", that is, the resulting content of counter 9 being (0, 0, 1). Whilst the one input terminal of each of the AND circuits 69 to 71 and 75 to 77 is supplied with a "1" signal from the closed switch 63, the other input terminal of each of AND circuits 69 and 75 is supplied with a "1" signal and that of each of AND circuits 70, 71, 76 and 77 is supplied with a "0" signal. As a result, only one luminous diode $L_1$ of each of the shutter speed display units 85 and 87 is energized to illuminate the indicium carrying member for 1/512 second, thereby the photographer being informed of the fact that the counter 9 has been set to a content corresponding to an exposure time of 1/512 second. Then, the photographer may release the control knob from the force applied thereon to open switch 50. Next, when the control knob is second time depressed to the first stroke to close the switch 50, the multivibrator 51 produces a second pulse which is counted up by the counter 9 with the resulting content being (0, 1, 0), that is, the second luminous diode $L_2$ of each of the shutter speed display units 85 and 87 being energized to illuminate an indicium-carrying member for 1/256 second. Such procedure repeats itself until a desired shutter speed as displayed in the unit 85 or 87 is set to the counter 9.

If a desired shutter speed is to be automatically set at a slower setting speed, the switch 50 is maintained in the open position, and switch 54 is depressed to the first stroke to bring its movable contact 54c into engagement with the fixed contact 54b, thereby the AND circuit 56 is gated on to pass pulses coming from the flip-flop 58 to the counter 9 through OR circuit 53. When the number of pulses counted by the counter 9 has reached a selected level corresponding to the desired shutter speed, the photographer who is viewing the display unit may release the switch 54 from the force applied thereon to terminate flow of pulses from flip-flop 58 to the counter 9.

If a desired shutter speed is to be automatically set at a faster setting speed, the switch 54 is depressed to the second stroke to bring its movable contact 54c into engagement with the fixed contact 54a, thereby the AND circuit 57 is gated on to pass pulses comming from the clock pulse generator 4 to the counter 9 through OR circuit 53. When the number of pulses counted by the counter 9 as displayed in the display unit 85 or 87 has reached a selected level, the photographer may release the switch 54 from the force applied thereon to terminate flow of pulses from the generator 4 to the counter 9.

If a desired diaphragm value is to be set to the counter 9, the photographer needs to open switch 63. In this case, instead of AND circuits 69 to 71 and 75 to 77, a gating signal is applied to each of AND circuit 72 to 74 and 78 to 80. By manipulation of either switch 50 or 54, therefore, a desired diaphragm value can be set into the counter 9 while viewing the display unit 86 or 88.

As the digital exposure control circuit of FIG. 1 is adapted for controlling the period of actuation of the shutter in accordance with a preselected shutter speed as set in the counter 9, it is impossible to use it with a preselected diaphragm value as set in the counter 9. However, such control circuit can be replaced by a diaphragm control circuit of the type shown in German Laid Open Patent Application No. 2,316,261 (dated Oct. 17, 1974) without the necessity of undue modification. The detailed description of such control circuit will not further be made, because the present invention is to provide a system for setting into the camera an exposure control factor independently of what the exposure control factor refers to, that is, shutter speed or aperture value. Although two pairs of display units 66 and 67 are provided for convenience, the one of the composite dispay unit 66 and 67 which is adapted for location outside the view finder may be disused by opening the power supply control switch 89 to prevent premature consumption of the energy of battery Vcc.

Figure 11:
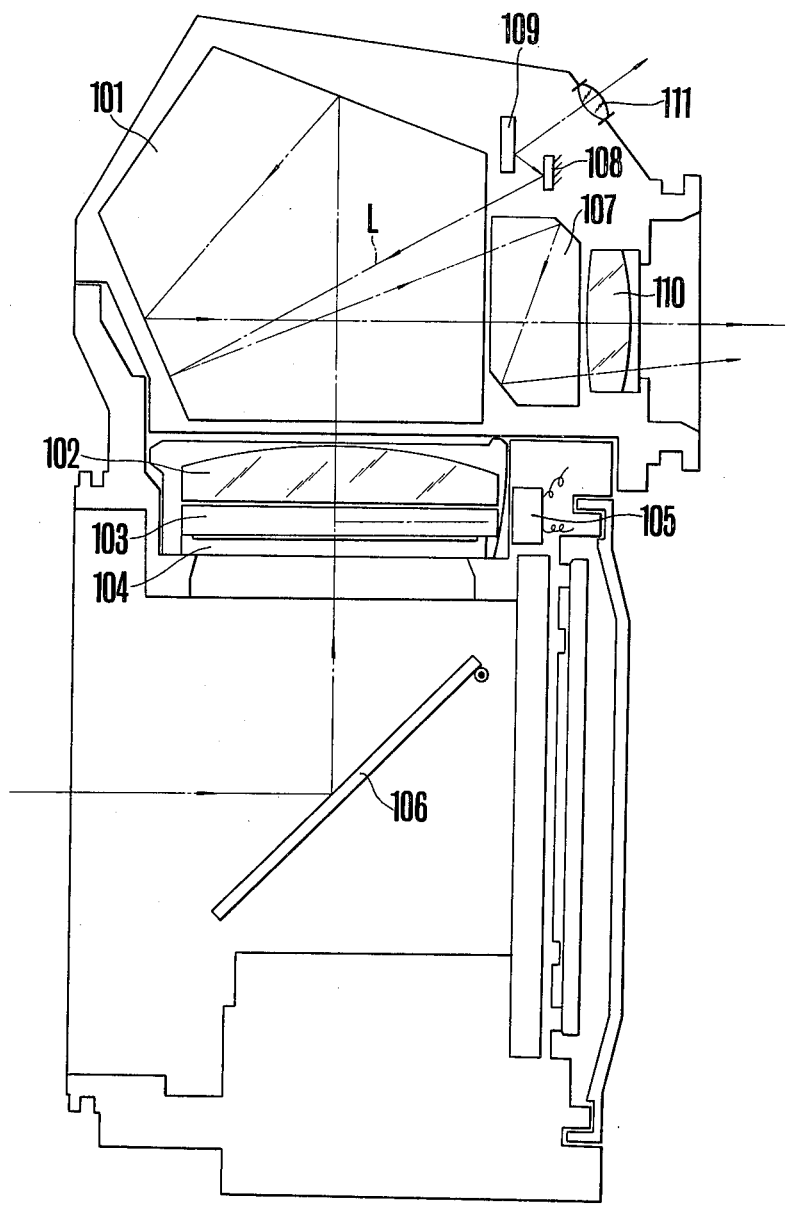
FIG. 11 is a sectional view of a reflex camera with the display unit of FIG. 9 being positioned within the housing of a camera viewfinder.

The two composite display units 66 and 67 may be replaced by a common composite display unit 66 arranged to be visible either through or outside the finder, as shown in FIG. 11, wherein there are a penta prism 101, a condenser lens 102, a beam splitter 103, a focusing screen 104, a photosensitive element 105, a tiltable mirror 106, a small prism 107 for display purpose arranged between the pentaprism 101 and an eye-piece 110, a fixed mirror 108 for display purpose, and a display unit 109 of construction shown in FIG. 10. 111 is a lens for the outside display purpose, in other words, light emanating from the display unit 109 passes through the lens 111 so that it can be viewed from the outside of the camera. On the other hand, with light passing through the parts 109–108–101–107, it can be viewed by the photographer looking through the view finder of FIG. 11.

Although the foregoing description has been made for setting an exposure factor such as shutter speed or aperture value into the counter, it is of course possible to set any other information such as photographic data.

What is claimed is:

1. A system for manually setting a photographic information into a digital exposure control circuit of a camera, said circuit having a pulse counter, said pulse counter having an input terminal and output terminals, which system comprises:
    (a) indicating means coupled to the output terminals of said pulse counter for indicating an exposure information to be set corresponding to the content stored in the pulse counter;
    (b) pulse forming means for producing a pulse train to be counted by the pulse counter;
    (c) gate means connected between the pulse forming means and the input terminal of said pulse counter for controlling a transmission of the pulse train from said pulse forming means; and
    (d) set control switching means connected to said gate means, wherein said switching means energizes said gate means during an interval of time measured from an initial actuation of the switching means by an operator to a subsequent actuation of the switching means by an operator when the value of the indicating means reaches a desired value.

2. A system according to claim 1, wherein said pulse forming means includes:
    (a) a pulse generator, and
    (b) a frequency dividing means connected to said pulse generator.

3. A system according to claim 1, wherein said gate means includes an AND circuit having an input terminal connected to the output terminal of said pulse forming means.

4. A system according to claim 1, wherein said pulse counter is a binary counter.

5. A system for manually setting a photographic information into a digital exposure control circuit of a camera, said circuit having a pulse counter, which system comprises:
 (a) a pulse generator;
 (b) a frequency divider connected between said pulse generator and said pulse counter;
 (c) decoder means having inputs connected to respective output stages of said pulse counter for decoding the number of pulses counted by said pulse counter;
 (d) indicating means connected to said decoder means for indicating a value of said photographic information to be set corresponding to the content stored in said pulse counter;
 (e) AND circuit means connected between said pulse generator and said frequency divider; and
 (f) a set control switching means connected to said AND circuit means, wherein said means energizes said AND circuit means during an interval of time measured from an initial actuation of the switching means by an operator to a subsequent actuation of the switching means by the operator when the value of the indicating means reaches a desired value.

6. A system for manually setting a photographic information into a digital exposure control circuit of a camera, said circuit having a pulse counter, which system comprises:
 (a) a pulse generator;
 (b) a frequency divider connected between said pulse generator and said pulse counter;
 (c) decoder means having inputs connected to respective output stages of said pulse counter for decoding the number of pulses counted by said pulse counter;
 (d) indicating means connected to said decoder means for indicating a value of said photographic information to be set corresponding to the content stored in said pulse counter;
 (e) AND circuit means connected between an output stage of said frequency divider and said pulse counter; and
 (f) a set control switching means connected to said AND circuit means, wherein said means energizes said AND circuit means during an interval of time measured from an initial actuation of the switching means by an operator to a subsequent actuation of the switching means by the operator when the value of the indicating means reaches a desired value.

7. A system according to claim 1, further including selecting means connected between said pulse forming means and said pulse counter for varying the frequency of pulses from said pulse forming means.

8. A system for manually setting a photographic information into a digital exposure control circuit of a camera, said circuit having a pulse counter, which system comprises:
 (a) indicating means connected to the output terminals of said pulse counter for indicating an exposure information to be set corresponding to the content stored in the pulse counter;
 (b) a pulse forming means for producing a pulse train to be counted by the pulse counter;
 (c) a gate means connected between the pulse forming means and the input terminal of said pulse counter for controlling a transmission of the pulse train from said pulse forming means;
 (d) a set control switching means connected to said gate means, wherein said switching means energizes said gate means during a time interval measured from an initial actuation of the switching means caused by an operator to a subsequent actuation of the switching means caused by the operator when the value of the indicating means reaches a desired value;
 (e) an electric power circuit;
 (f) a power switch for controlling a power supply to the system; and
 (g) timer circuit means for producing a power holding signal to maintain the content of said pulse counter during a predetermined time interval following a suppressing action of the power supply caused by the power switch.

9. A photographic camera comprising:
 (a) a pulse counter having an input terminal and output terminals;
 (b) indicating means connected to the output terminals of said pulse counter for indicating an exposure information to be set corresponding to the content stored in the pulse counter;
 (c) a pulse forming means for producing a pulse train to be counted by the pulse counter;
 (d) a gate means connected between the pulse forming means and the input terminal of said pulse counter for controlling a transmission of the pulse train from said pulse forming means;
 (e) a set control switching means connected to said gate means, wherein said switching means energizes said gate means during a time interval measured from an initial actuation of the switching means by an operator to a subsequent actuation of the switching means by the operator when the value of the indicating means reaches a desired value; and
 (f) exposure control means for controlling an exposure value based on the exposure information stored in the pulse counter.

* * * * *